J. A. ANDERSON.
LATHE TOOL.
APPLICATION FILED FEB. 16, 1918.
1,290,040.
Patented Jan. 7, 1919.
2 SHEETS—SHEET 2.
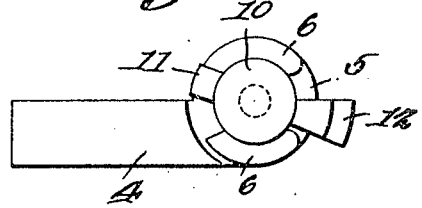
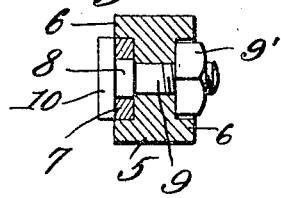 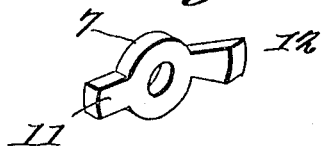
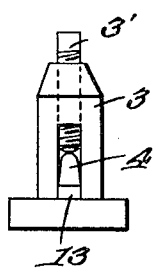 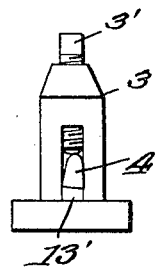 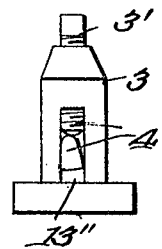
J. A. Anderson
Inventor
Witness

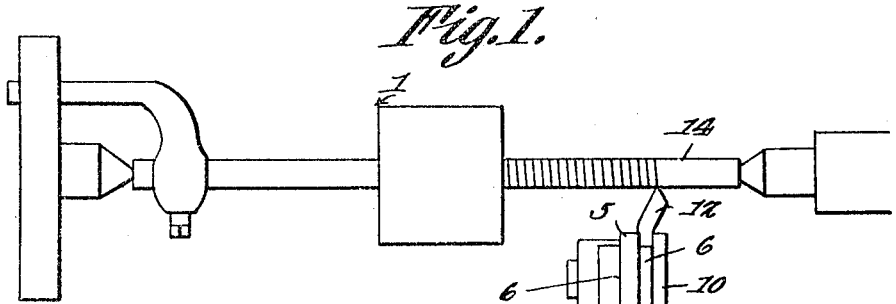
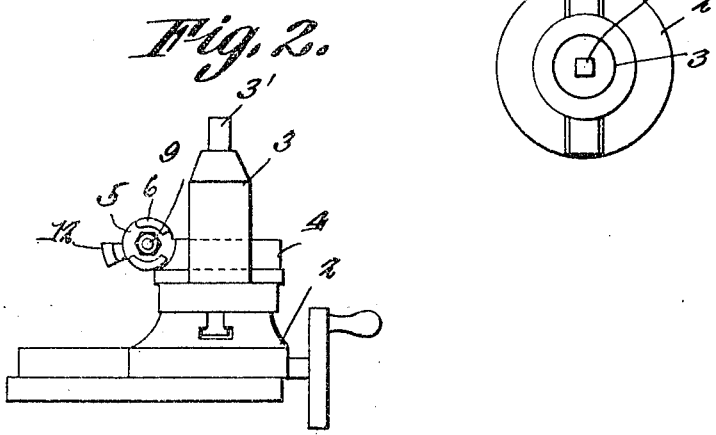
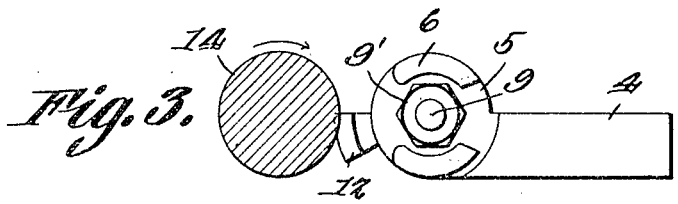
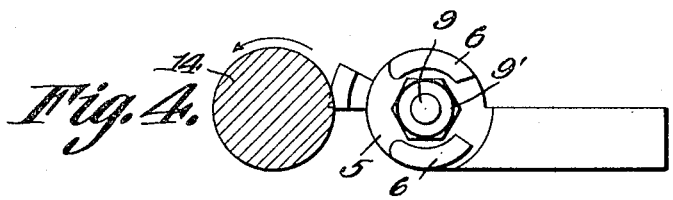

UNITED STATES PATENT OFFICE.

JOHN A. ANDERSON, OF GENESEO, ILLINOIS.

LATHE-TOOL.

1,290,040.      Specification of Letters Patent.      Patented Jan. 7, 1919.

Application filed February 16, 1918. Serial No. 217,592.

*To all whom it may concern:*

Be it known that I, JOHN A. ANDERSON, a citizen of the United States, residing at Geneseo, in the county of Henry and State of Illinois, have invented a new and useful Lathe-Tool, of which the following is a specification.

The present invention relates to a lathe tool, including its holder, and especially to that form of tool intended for cutting threads.

With the ordinary tool for cutting threads, the tool moves in but one direction while cutting and, upon its return movement, must travel idle thus losing time. The tool, before it can begin its return movement, must also be moved from the work so that the tool may pass the threads; again losing time. When the tool has returned to its starting point it must be reset in the thread groove anew, and must not be set too deep. This requires care and experience.

The tool which forms the subject matter of this invention is designed to overcome these defects, and to provide a tool which will cut both ways and which need not be moved from the work until the operation of cutting the thread is completed.

The invention also contemplates the production of a tool which may be used either right-handed or left-handed.

The invention also contemplates the production of a tool which will automatically reverse when the carriage reaches the end of its forward stroke or travel and starts on its return travel.

The invention further contemplates the production of a simple, durable and efficient tool and holder.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is illustrated in the accompanying drawings, wherein:—

Figure 1 is a conventional showing of a lathe showing the same in plan view with a tool constructed in accordance with the invention in operative position therein;

Fig. 2 is a view in elevation of a carriage with the tool therein;

Fig. 3 is a view in side elevation, partly in section, illustrating the position of the tool when the carriage is on its forward travel;

Fig. 4 is a similar view illustrating the position of the tool when the carriage is on its return trip;

Fig. 5 is an enlarged view of the tool viewed from the opposite side from that shown in Figs. 3 and 4;

Fig. 6 is a cross section through the head of the tool holder;

Fig. 7 is a perspective view of the tool;

Fig. 8 is a view in elevation of the tool post illustrating the set of the tool holder when testing the lathe for trueness;

Fig. 9 is a similar view illustrating the set of the tool holder when cutting right hand threads;

Fig. 10 is a similar view illustrating the set of the holder when cutting left hand threads.

Referring to the drawings by numerals of reference:—

An ordinary lathe is indicated at 1 which is provided with the usual carriage 2, upon which is mounted the tool post 3 provided with a set screw 3' for clamping the tool holder in place in the post.

In carrying out the invention a tool holder is provided having a shank 4 upon one end of which is formed a centrally apertured circular head 5. The head 5 has formed on each face thereof substantially diametrically opposed, arcuate ribs 6, which form stops.

A cutting tool having a centrally apertured circular body 7 is adapted to rest against either face of the head 5 within the arcuate ribs 6, and its central aperture receives the enlarged neck 8 of a bolt 9, the flat disk-like head 10 of which engages the outer face of the body 7. A nut 9' may be threaded on the end of the bolt 9 for the purpose of clamping the bolt and tool in place. As will be understood, the tool is free to pivot on the neck 8 of the bolt 9, its pivotal movement being limited by the finger 11 contacting the end of a rib 6.

The tool is formed with a radially extending finger 11 and, at a diametrically opposed point, with a radially extending, angularly disposed cutting blade 12.

The tool rests 13, 13' and 13" are provided for setting the tool to test the lathe, for cutting right-handed threads, and for cutting left-handed threads, respectively.

As will be seen, the tool may be placed on either face of the head 5, depending on the character of work to be done, and will work with equal facility in either position. It is also apparent that it will pivot from the position shown in Fig. 3 to that shown in Fig. 4 when the work 14 is reversed from a clock-wise to a counter clock-wise rotation.

It is thought that the device and its operation will be fully understood from the foregoing description and explanation without a detailed account of the operation.

Having thus described the invention, what is claimed as new and sought by Letters Patent, is:—

1. A lathe tool, including a holder comprising a bar formed with a head having an opening, and stops formed on the opposite sides of the head, a tool having an aperture adapted to aline with the opening of the head, a finger extending from the tool and adapted to contact the stops, and means insertible through the aperture and opening for binding the tool at either face of the head.

2. A lathe tool, including a holder comprising a bar formed with a head, and stops formed on each side of the head, a tool, a finger extending from the tool and adapted to contact the stops, and means for securing the tool to either face of the head to oscillate between the stops.

In testimony that I claim the foregoing as my own, I have hereto affixed by signature in the presence of two witnesses.

JOHN A. ANDERSON.

Witnesses:
 W. R. REHERD,
 HANNA SALEM.

Copies of this patent may be obtained for five cents each, by addressing the "Commissioner of Patents, Washington, D. C."